(12) United States Patent  (10) Patent No.: US 6,516,909 B2
Gogo  (45) Date of Patent: Feb. 11, 2003

(54) PIPING STRUCTURE FOR BRAKE HOSE FOR MOTORCYCLES

(75) Inventor: Kazuhiko Gogo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/879,946

(22) Filed: Jun. 14, 2001

(65) Prior Publication Data
US 2002/0014365 A1 Feb. 7, 2002

(30) Foreign Application Priority Data

Jun. 14, 2000 (JP) ......................... 2000-178596

(51) Int. Cl.⁷ .......................... B60T 11/18; B62K 25/10
(52) U.S. Cl. ...................... 180/219; 180/227; 188/72.4
(58) Field of Search ................... 180/219, 227, 180/315; 280/284; 60/585; 188/26, 72.1, 72.4

(56) References Cited

U.S. PATENT DOCUMENTS

| 4,702,339 A | * | 10/1987 | Hayashi et al. | 180/219 |
| 4,742,884 A | * | 5/1988 | Ishikawa | 180/219 |
| 4,766,982 A | * | 8/1988 | Hayasi et al. | 180/219 |
| 5,236,212 A | * | 8/1993 | Duehring | 280/281.1 |
| 5,607,031 A | * | 3/1997 | Hollars | 180/26 |
| 6,336,328 B1 | * | 1/2002 | Inami | 60/585 |

FOREIGN PATENT DOCUMENTS

| JP | 2-128986 | * | 2/1990 |
| JP | 3-189282 | * | 3/1991 |
| JP | 2506358 | | 4/1996 |

* cited by examiner

Primary Examiner—Anne Marie Boehler
(74) Attorney, Agent, or Firm—Birch, Stewart, Kolasch and Birch, LLP

(57) ABSTRACT

A master cylinder is disposed forwardly of a rear fork. A brake hose extends from the master cylinder to a brake caliper. The brake hose has a first U-shaped portion formed between the master cylinder and a portion of the brake hose fixed to the rear fork. A second U-shaped portion is formed in the brake hose between the portion fixed to the rear fork and the brake caliper. The second U-shaped portion is held by a first hose guide. Adjustment in the position of a rear axle relative to the frame, to accommodate elongation of a drive chain, is absorbed by the second U-shaped portion. Suspension movement of the rear axle relative to the frame during travel is absorbed by the first U-shaped portion.

17 Claims, 8 Drawing Sheets

PIPING STRUCTURE FOR BRAKE HOSE FOR MOTORCYCLES

BACKGROUND OF THE INVENTION

1. Field of the Invention

The present invention relates to a piping structure for a brake hose for a motorcycle.

2. Description of the Relevant Art

Brake hoses for motorcycles are used in brake devices, and are laid in order to absorb vertical movement of a wheel with respect to a fixed position on a motorcycle body. One such brake hose structure is disclosed in Japanese Patent No. 2506358 entitled "Hydraulic Brake Device for Rear Wheel in a Motor Vehicle such as a Motorcycle." As shown in FIG. 9, about one turn of a brake pipe 25 is wound on a front end of a rear arm 8, in accordance with the background art.

However, with about one turn of the brake pipe 25 wound on the rear arm 8, a brake hose tends to hit the rear arm 8. Particularly, the brake hose is liable to be worn by intensive vibrations and large vertical movement of the rear wheel on an off-road vehicle that often runs on rough terrain.

If a bend in the brake hose is placed on the rear arm 8, then the bend is positioned closely to a rear portion of the engine, resulting in reduced leeway for the shape of the rear portion of the engine.

SUMMARY OF THE INVENTION

It is therefore an object of the present invention to provide a piping structure for a brake hose for a motorcycle, which allows increased leeway for the shape of the rear portion of the engine of the motorcycle.

In order to attain the object described above, the present invention provides a piping structure for a brake hose for a motorcycle. The motorcycle has a master cylinder for a rear disc brake that is mounted on a motorcycle body forwardly of a rear fork. A brake hose extends from the master cylinder and is directed forwardly, then turns back, forming a first U-shaped portion. The first U-shaped portion extends along an upper surface of the rear fork, and connects to a brake caliper of a rear wheel. The brake hose has a portion fixed to the rear fork at a location that is closer to the brake caliper than the first U-shaped portion. A portion of the brake hose that is closer to the brake caliper than the fixed portion is curved into a second U-shaped portion. The second U-shaped portion is convex toward the center of the motorcycle body. The brake hose is held near the second U-shaped portion by a first hose guide which limits the brake hose against upward movement, but allows the brake hose to move parallel to the surface of the rear fork.

The first U-shaped portion is formed in the brake hose, and the portion of the brake hose that is closer to the brake caliper than the first U-shaped portion is fixed to the rear fork. The first U-shaped portion absorbs changes in the brake hose that are caused as the rear fork moves vertically.

The second U-shaped portion is formed in the brake hose more closely to the brake caliper than the fixed portion of the brake hose. The brake hose is held by the first hose guide near the second U-shaped portion. The second U-shaped portion absorbs axial movement of the brake hose.

Since an ability to absorb changes in the brake hose is distributed between the first U-shaped portion and the second U-shaped portion, the space occupied by the area where the first U-shaped portion is arranged can be reduced. Therefore, the leeway for the shape of the rear portion of the engine is increased.

According to the present invention, the piping structure is characterized in that the first hose guide is mounted on a cross member of the rear fork. With the first hose guide mounted on the cross member, the second U-shaped portion is formed on the cross member.

According to the present invention, the piping structure is characterized in that a portion of the brake hose that is closer to the brake caliper than the second U-shaped portion is held by a second hose guide. The second hose guide limits the brake hose against movement in a direction perpendicular to the axis of the brake hose, but allows the brake hose to move in the axial direction of the brake hose. With the brake hose held by the second hose guide, the brake hose can easily be moved in the axial direction thereof.

According to the present invention, the piping structure is characterized in that the brake hose has a high flexural rigidity in a region extending from the portion held by the second hose guide toward the brake caliper. Further, the brake hose has a flexural rigidity, lower than the high flexural rigidity, in a region extending from the portion held by the second hose guide toward the master cylinder. For providing different flexural rigidities, material and/or structural differences may be introduced by using different materials and/or different outside diameters.

By increasing the flexural rigidity in the region extending toward the brake caliper, the wear resistance and fatigue strength of the brake hose positioned close to the rear wheel are increased. By making the flexural rigidity in the region extending toward the master cylinder lower than the flexural rigidity in the region extending toward the brake caliper, the second U-shaped portion can easily be formed, and the brake hose can easily be assembled.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
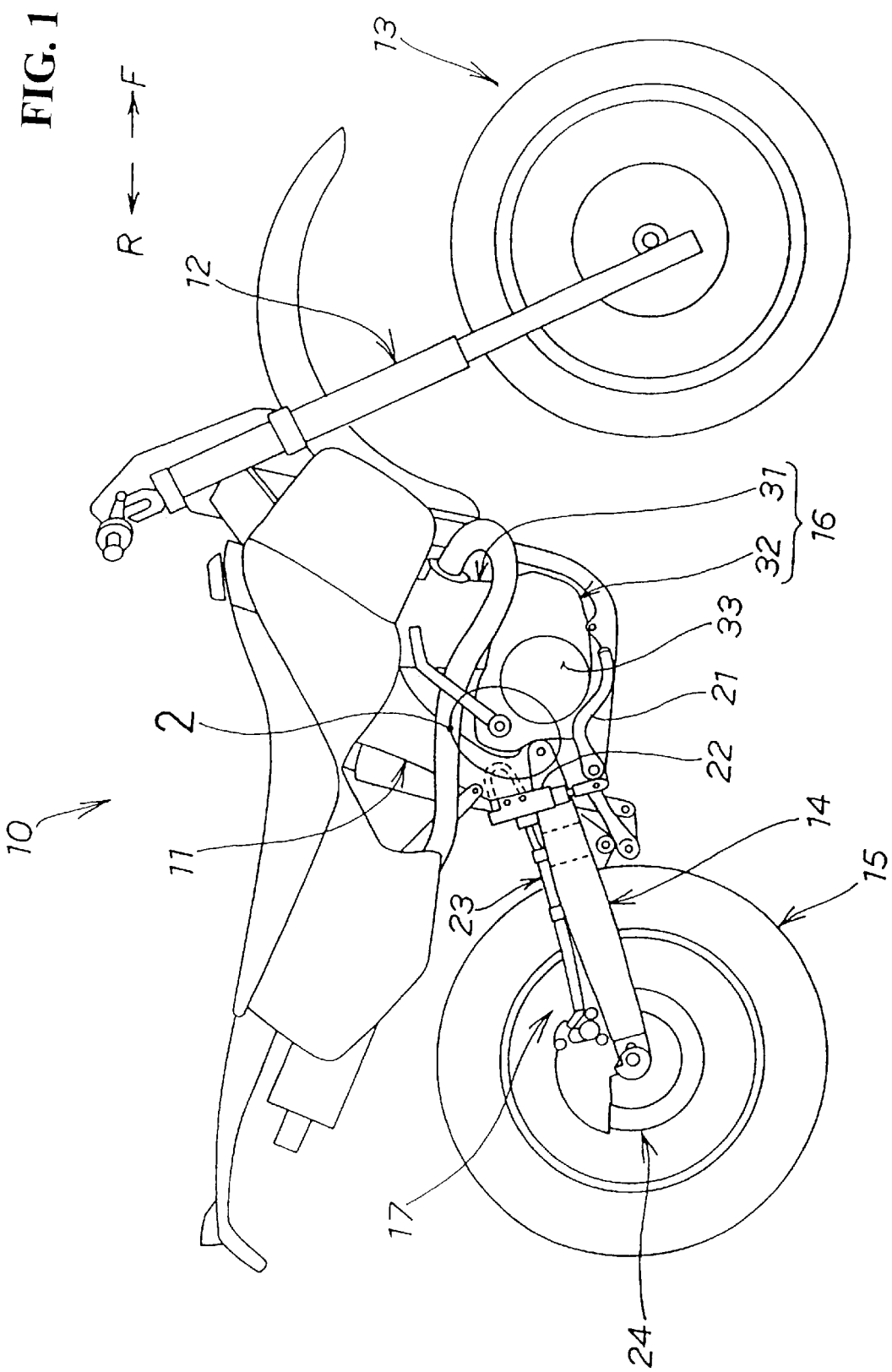
FIG. 1 is a side view of a typical motorcycle having a piping structure for a brake hose, according to the present invention.

FIG. 1 is a side view of a motorcycle having a piping structure for a brake hose, according to the present invention. The motorcycle 10 has a body frame 11. A front fork 12 is mounted on the body frame 11. A front wheel 13 is attached to the front fork 12. A rear fork 14 is mounted on the body frame 11. A rear wheel 15 is attached to the rear fork 14. An engine 16 is provided for driving the rear wheel 15. Finally, a rear brake device 17 is connected to the rear wheel 15. The letters "F" and "R" represent forward and rearward directions, respectively, with respect to a normal travel direction of the motorcycle.

The rear brake device 17 has a brake pedal 21 and a master cylinder 22, which are mounted on a lower portion of the body frame 11. A brake hose 23 has an end connected to the master cylinder 22 and an opposite end connected to a rear disc brake 24. Details of the rear brake device 17 will be described later on.

The engine 16 comprises a cylinder block 31 and a power transmitting device 32 mounted on the cylinder block 31. The engine 16 also includes a crankcase cover 33.

Figure 2:
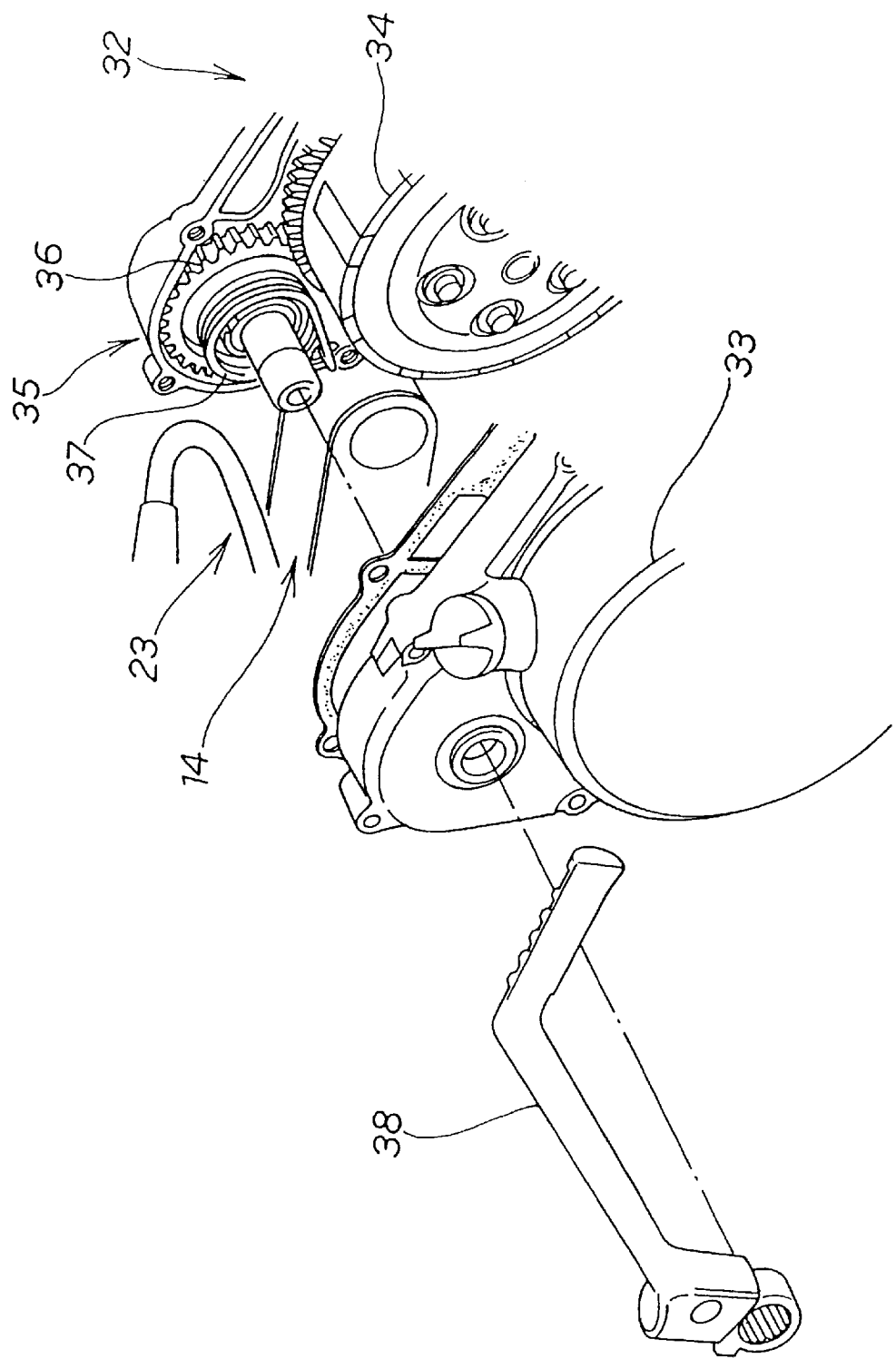
FIG. 2 is an exploded view of an encircled area 2, shown in FIG. 1.

FIG. 2 shows in detail an encircled area 2, shown in FIG. 1. FIG. 2 illustrates a portion of the power transmitting device 32. The power transmitting device 32 comprises a clutch 34 and a kick starter mechanism 35 held in mesh with a gear of the clutch 34.

The kick starter mechanism 35 serves to start the engine, and comprises a kick starter gear 36 held in mesh with the clutch 34, a spring 37 for returning the kick starter gear 36 in rotation, and a kick starter arm 38 for rotating the kick starter gear 36 with a foot.

Figure 3:
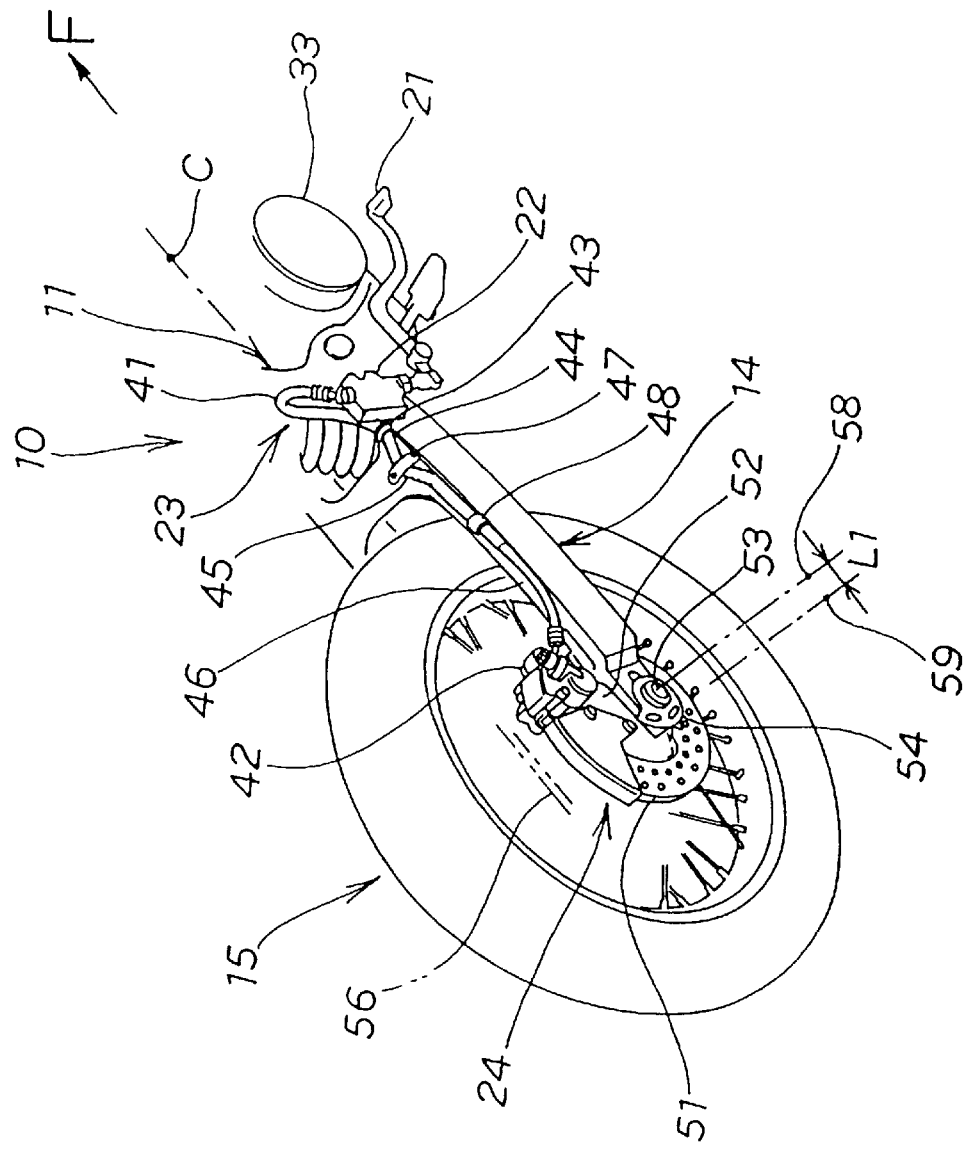
FIG. 3 is a perspective view of a piping structure for a brake hose for a motorcycle, according to the present invention.

FIG. 3 is a perspective view of a piping structure for a brake hose for a motorcycle, according to the present invention. A master cylinder 22 for the rear disc brake 24 of the motorcycle 10 is mounted on the body frame 11, as a motorcycle body, forwardly (in the direction F) of the rear fork 14. A brake hose 23 extends from the master cylinder 22 and is directed forwardly F, then turned back forming a first U-shaped portion 41. The brake hose 23 then extends along an upper surface of the rear fork 14, and is connected to a brake caliper 42 of the rear disc brake 24 of the rear wheel 15.

The brake hose 23 has a portion fixed by a clamp 43 to the rear fork 14 at a location that is closer to the brake caliper 42 than the first U-shaped portion 41. The brake hose 23 also has a portion that is closer to the brake caliper 42 than the fixed portion 44 and curved into a second U-shaped portion 45. The second U-shaped portion 45 is convex toward the center C of the motorcycle body. The brake hose 23 is held near the second U-shaped portion 45 by a first hose guide 47. The first hose guide 47 limits the brake hose against upward movement, but allows the brake hose to move parallel to a surface 46 of the rear fork 14. A portion of the brake hose that is closer to the brake caliper 42 than the second U-shaped portion 45 is held by a second hose guide 48.

The rear disc brake 24 has a brake disk 51 integrally attached to the rear wheel 15. A bracket 52 is attached to the rear fork 14. Further, the rear wheel 15 is rotatably attached to the rear fork 14 via a rear axle 53. The brake caliper 42 is mounted on the bracket 52.

The rear axle 53 extends through chain adjusters 54 (only one closer to the viewer is shown), which adjust the play or tension of a chain 56. The rear axle 53 is shown as being in a foremost position 58, and can be set in a rearmost position 59 at a maximum graduation of the chain adjusters 54. The distance from the foremost position 58 to the rearmost position 59 represents an adjusting interval L1 capable of absorbing an elongation of the chain 56.

Figure 4:
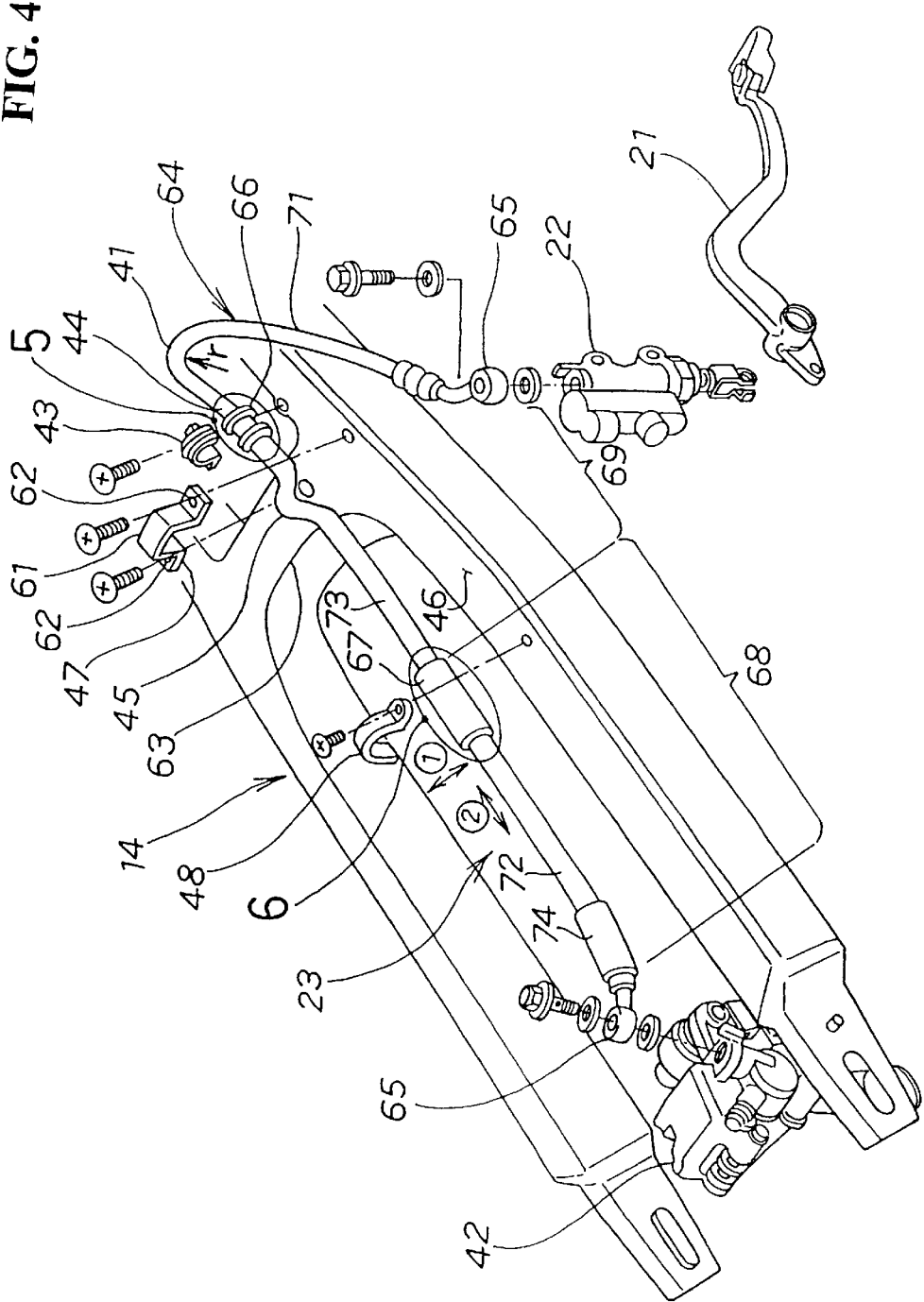
FIG. 4 is an exploded view of the piping structure for the brake hose for the motorcycle, according to the present invention.

FIG. 4 is an exploded perspective view of the piping structure for the brake hose for the motorcycle, according to the present invention. FIG. 4 shows the first hose guide 47, the second hose guide 48, and the brake hose 23 as they are detached from the rear fork 14.

The first hose guide 47 has a guide member 61 with attachment holes 62, and is attached to the cross member 63 of the rear fork 14 with fasteners inserted in the attachment holes 62. The guide member 61 limits the brake hose against upward movement, but allows the brake hose to move parallel to the surface 46 of the rear fork 14.

The second hose guide 48 limits the brake hose 23 against movement in a direction, indicated by the arrow ①, perpendicular to the axis of the brake hose 23, but allows the brake hose 23 to move in the axial direction, indicated by the arrow ②, of the brake hose 23.

The brake hose 23 comprises a hose 64. Joints 65 are attached to respective opposite ends of the hose 64. A bushing 66 is attached to the fixed portion 44. The brake hose 23 has a high flexural rigidity in a region 68 extending from a retainer 67 held by the second hose guide 48 toward the brake caliper 42. The brake hose 23 has a flexural rigidity, lower than the high flexural rigidity, in a region 69 extending from the retainer 67 toward the master cylinder 22.

The hose 64 comprises a hose body 71 covered with a protector layer 72. Shrink tubes 73, 74 are disposed over opposite sides of the protector layer 72 and the hose body 71.

The first U-shaped portion 41 has a minimum radius r of curvature, which is a radius (loose portion) capable of absorbing only vertical movement of the rear fork 14. The portion of the brake hose that is closer to the brake caliper 42 than the second U-shaped portion 45 serves as the retainer 67.

Figure 5:
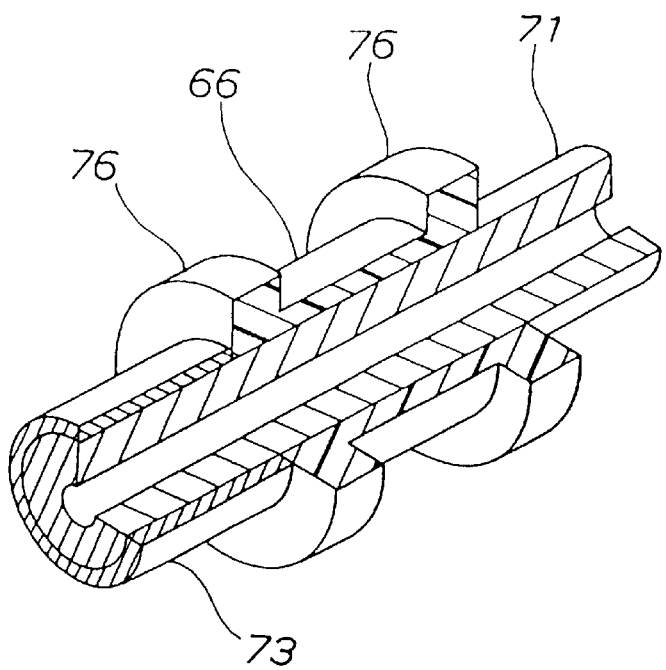
FIG. 5 is a cross-sectional view of an encircled area 5, shown in FIG. 4.

FIG. 5 is a cross-sectional view of an encircled area 5 shown in FIG. 4. FIG. 5 illustrates the bushing 66 mounted on the hose body 71. The bushing 66 has flanges 76 for preventing the clamp from being dislodged and for protecting the hose body 71.

Figure 6:
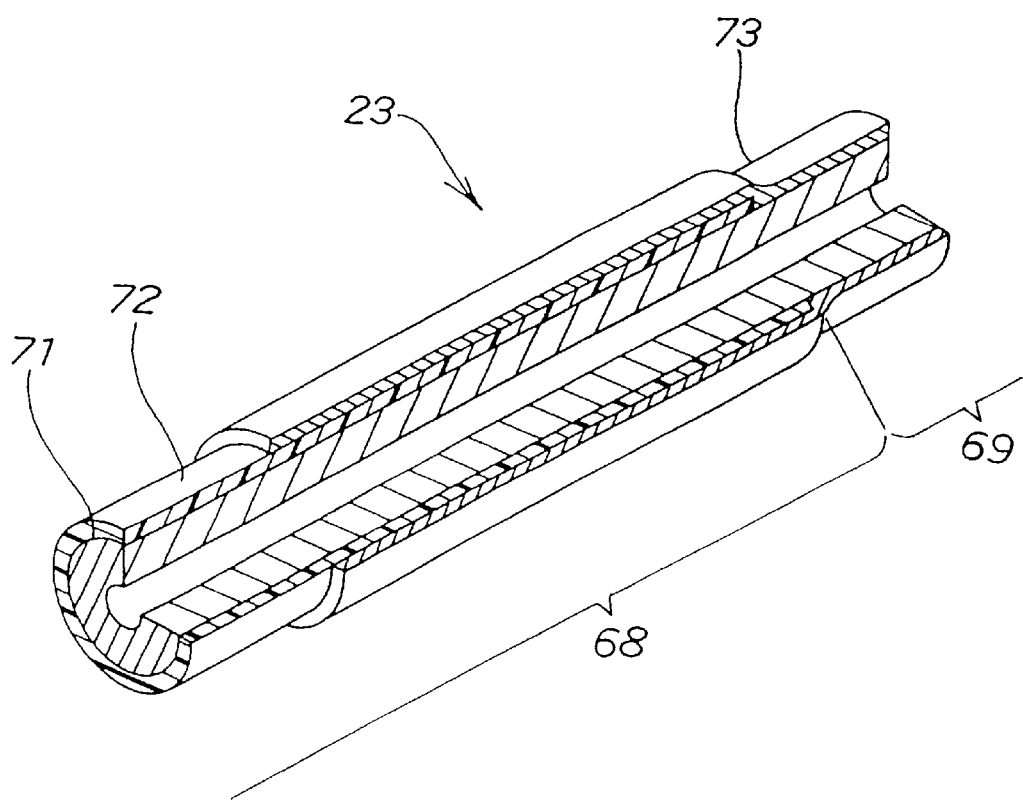
FIG. 6 is a cross-sectional view of an encircled area 6, shown in FIG. 4.

FIG. 6 is a cross-sectional view of an encircled area 6 shown in FIG. 4. FIG. 6 illustrates the hose body 71 covered with the protector layer 72, which is in turn covered with the shrink tube 73. The hose body 71 is covered with the protector layer 72, thus increasing the flexural rigidity of the region 68 of the brake hose 23.

Operation of the piping structure for the brake hose, according to the present invention, will be described below with reference to FIGS. 7(a), 7(b) and 8.

Figure 7A:
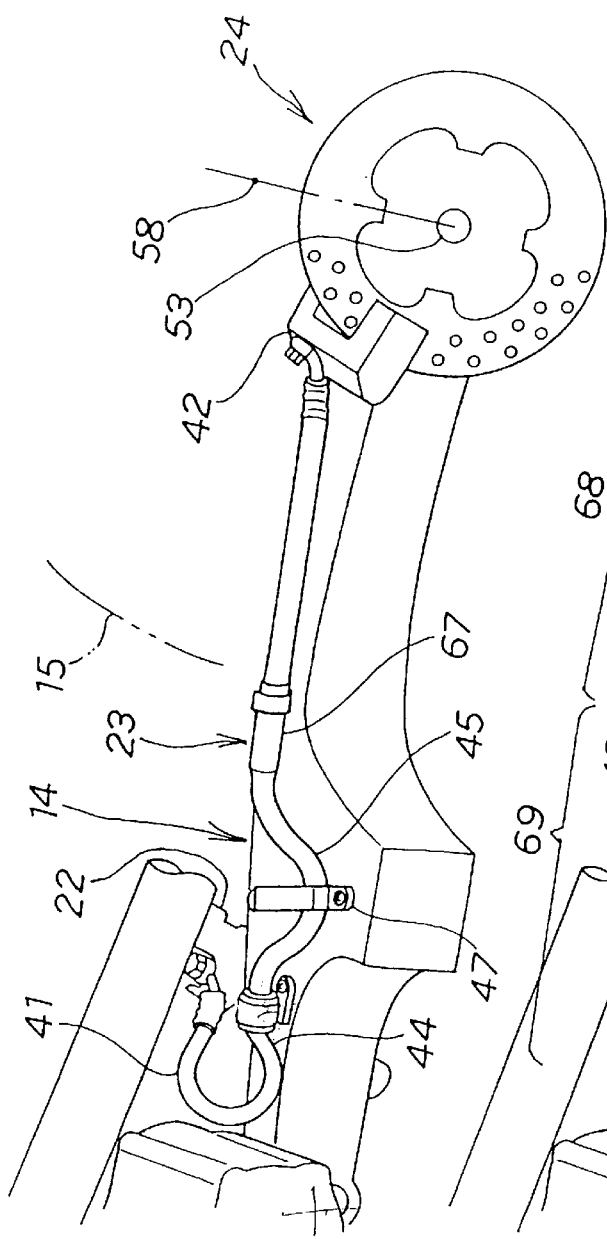
FIG. 7(a) is a view of the piping structure in a first state.
Figure 7B:
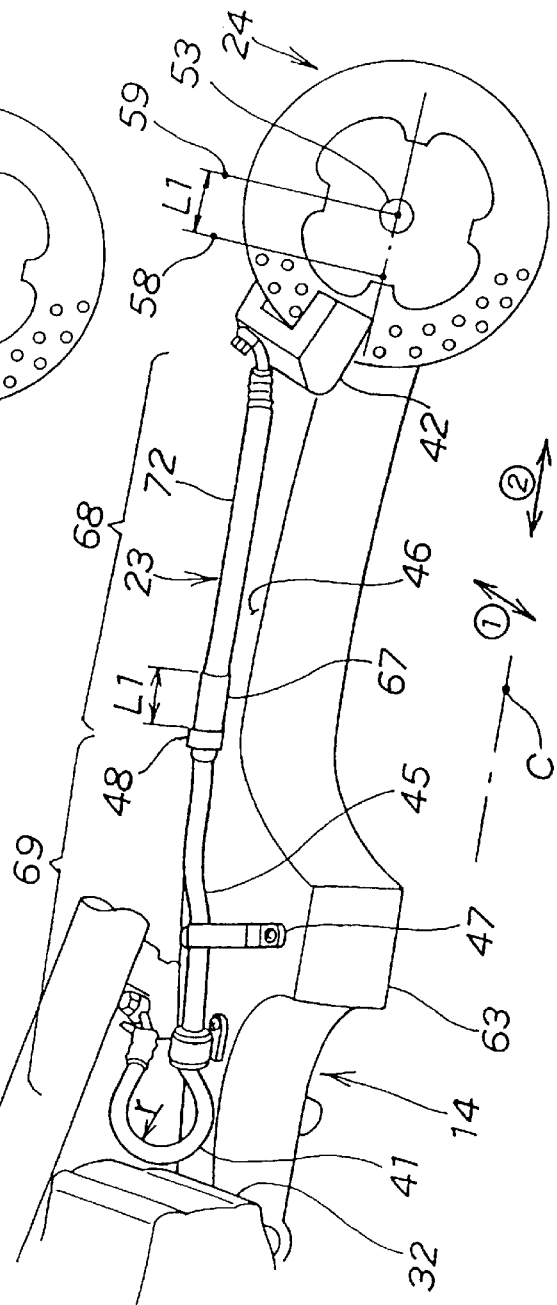
FIG. 7(b) is a view illustrating the piping structure after movement of a rear arm in one direction.

FIGS. 7(a) and 7(b) are first views illustrating an operation of the piping structure for the brake hose for the motorcycle according to the present invention. In FIG. 7(a), the rear wheel 15 is mounted on the rear fork 14 by the rear axle 53. The rear disc brake 24 is set in the foremost position 58. The first U-shaped portion 41 is formed in the brake hose 23 that extends from the master cylinder 22 for the rear disc brake 24. The second U-shaped portion 45 is curved in the portion that extends from the fixed portion 44 toward the brake caliper 42. The brake hose 23 is held closely to the second U-shaped portion 45 by the first hose guide 47, and the brake hose 23 is attached to the rear fork 14.

In FIG. 7(b), the rear axle 53 is moved by an adjusting interval L1 from the foremost position 58 to the rearmost position 59. Movement of the rear axle 53 is made to adjust the play of the chain. Moving the rear axle 53 by the adjusting interval L1 equates to moving the rear disc brake 24 and the retainer 67 of the brake hose 23 by the adjusting interval L1. This movement elongates the second U-shaped portion 45 formed in the brake hose 23, thereby absorbing the movement by the adjusting interval L1.

By the present invention, it is not necessary to incorporate a setting for the movement by the adjusting interval L1 in the first U-shaped portion 41. In other words, the first U-shaped portion 41 is not effected by movement of the rear axle 53 in a direction to accommodate elongation of the chain. Rather the first U-shaped portion 41 is unchanged by movement of the rear axle in this adjustment direction. As a result, the radius of curvature of the first U-shaped portion 41 may be set to the minimum value r, and hence the space for accommodating the first U-shaped portion 41 therein may be reduced. Accordingly, the leeway for the shape of the rear portion of the engine (and/or the power transmitting device 32) can be increased.

With the increased leeway for the shape of the rear portion of the engine, the leeway for the layout of the kick starter gear 36 shown in FIG. 2 is increased. Increasing the leeway for the kick starter gear 36 means that the number of teeth of the kick starter gear 36 can be increased, thereby improving the easy and reliability of kick starting the engine.

Since the first hose guide 47 is mounted on the cross member 63 of the rear fork 14, the second U-shaped portion 45, curved so as to be convex toward the center C of the motorcycle body, can be held on the cross member 63. Therefore, the radius of curvature of the second U-shaped portion 45 can be set to a large value.

Inasmuch as the first hose guide 47 limits the brake hose 23 against upward movement, but allows the brake hose 23 to move parallel to the surface 46 of the rear fork 14, the rear axle 53 can be moved to adjust the play of the chain without removal of the first hose guide 47. Thus, the rear axle 53 can be adjusted without undue trouble.

The retainer 67, which serves as the portion of the brake hose that is closer to the brake caliper 42 than the second U-shaped portion 45, is held by the second hose guide 48. Therefore, the protector layer 72 is reliably held in position against detachment from the rear fork 14.

The second hose guide 48 limits the brake hose 23 against movement in the direction, indicated by the arrow ①, perpendicular to the axis of the brake hose 23. However, the second hose guide 48 allows the brake hose 23 to move in the axial direction of the brake hose 23, indicated by the arrow ②. Consequently, the rear axle 53 can be moved to adjust the play of the chain without removal of the second hose guide 48. Thus, the rear axle 53 can be adjusted without undue trouble.

In addition, the brake hose 23 includes the protector layer 72 for increasing the flexural rigidity of the portion 68 extending toward the brake caliper 42. As a result, the brake hose 23 exhibits an increased wear resistance and fatigue strength. The increased wear resistance and fatigue strength protect the brake hose 23 from damage due to engine vibration, running vibration, and/or flying pebbles. Further, because the flexural rigidity of the portion 68 extending toward the brake caliper 42 is increased, the brake hose 23 can be moved in the axial direction (indicated by the arrow ②) with ease.

Furthermore, since the flexural rigidity of the portion 69 extending toward the master cylinder 22 is lower than the flexural rigidity of the portion 68 extending toward the brake caliper 42, the brake hose 23 can desirably be extended and contracted upon bending of the first U-shaped portion 41 and the second U-shaped portion 45.

Figure 8:
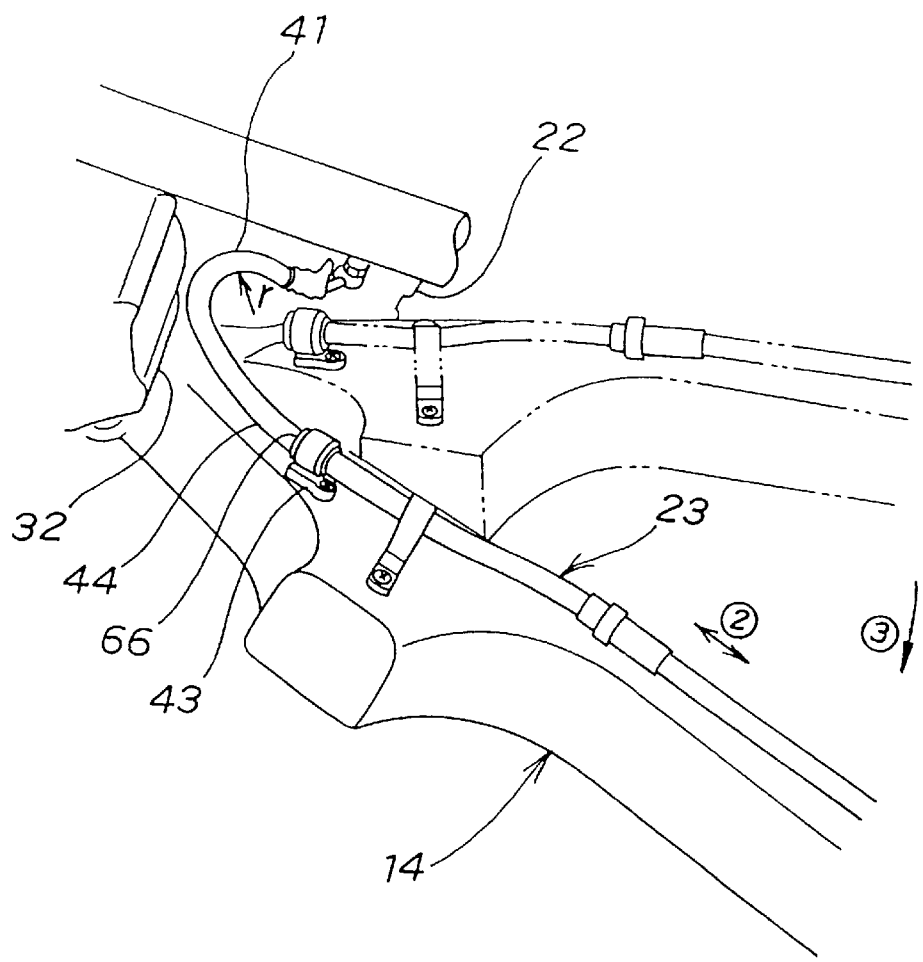
FIG. 8 is a view illustrating the piping structure after movement of the rear arm in another direction.
Figure 9:
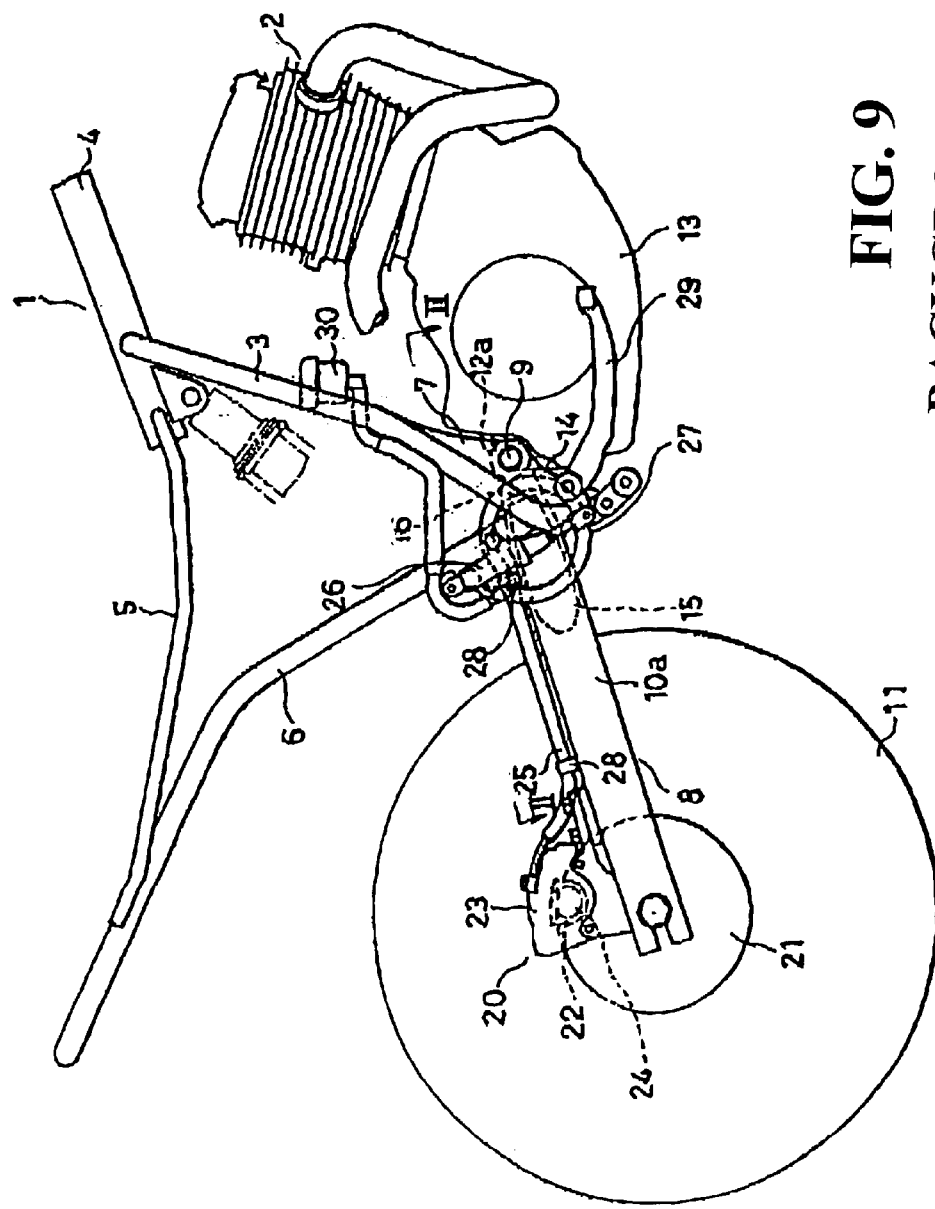
FIG. 9 is a side view of a piping structure, in accordance with the background art.

FIG. 8 is a second view illustrating an operation of the piping structure for the brake hose for the motorcycle according to the present invention. As illustrated, the first U-shaped portion 41 is formed in a length of the brake hose 23 that extends from the master cylinder 22 to the fixed portion 44. The fixed portion is fixed to the rear fork 14 by the bushing 66 and the clamp 43. When the rear fork 14 swings downward (as shown by the arrow ③) from an upper position indicated by the imaginary, dashed line, the brake hose 23 does not slide in the bushing 66 in the axial direction indicated by the arrow ②. Therefore, the radius r of curvature (loose portion) of the first U-shaped portion 41 does not become excessive or insufficient. This means that the first U-shaped portion 41 will not be brought into contact with the rear portion of the engine (and/or the power transmitting device 32). Also, this means that the brake hose 23 will not be unduly deformed and collapsed. Thus, the fatigue strength of the brake hose 23 is maintained, and the leeway for the shape of the rear portion of the engine is increased.

The master cylinder 22 and the brake caliper 42 shown in FIG. 3, according to the illustrated embodiment of the present invention, may be installed at any desired position. Depending on the position where the brake caliper 42 is installed, the brake hose 23 may be placed so as to extend along a lower or side surface of the rear fork 14. The rear fork 14 shown in FIG. 4 may be of any desired shape. Further, the cross member 63 may also be of any desired shape. While the hose body 71 is covered with the protector layer 72 and the shrink tubes 73, 74 in the illustrated embodiment, only the hose body 71 may be used without being covered with the protector layer 72 and/or the shrink tubes 73, 74.

The present invention, having the above-described configuration, exhibits many improved characteristics. For example, according to the present invention, the brake hose has a first U-shaped portion extending from the master cylinder, a portion fixed to the rear fork at a location that is closer to the brake caliper than the first U-shaped portion, and a second U-shaped portion that is closer to the brake caliper than the fixed portion. The brake hose is held near the second U-shaped portion by a first hose guide which limits the brake hose against upward movement, but allows the brake hose to move parallel to a surface of the rear fork. Therefore, as the first U-shaped portion expands and contacts, it absorbs vertical swinging movement of the rear fork. As the second U-shaped portion expands and contacts, it absorbs movement of the brake caliper caused when the rear axle is adjusted to adjust the play of the chain.

By the present invention, it is not necessary to incorporate a setting for the movement of the brake caliper in the first U-shaped portion. As a result, the radius of curvature of the first U-shaped portion may be extremely reduced, and hence the space for placing the first U-shaped portion therein, behind the rear portion of the engine, may be reduced. Accordingly, the leeway for the shape of the rear portion of the engine can be increased.

According to the present invention, since the first hose guide is disposed on the cross member of the rear fork, the second U-shaped portion can be formed on the cross member and can be movably held. As a result, the second U-shaped portion can smoothly be moved out of interference with other members when the rear axle is adjusted to adjust the play of the chain.

According to the present invention, the portion of the brake hose that is closer to the brake caliper then said second U-shaped portion is held by the second hose guide. The second hose guide limits the brake hose against movement in a direction perpendicular to the axis of the brake hose, but allows the brake hose to move in the axial direction of the brake hose. Thus, when the rear axle is adjusted to adjust the play of the chain, the brake hose can be moved axially without removal of the second hose guide. Thus, the rear axle can be adjusted without undue trouble.

According to the present invention, the brake hose has a high flexural rigidity in the region extending from the portion held by the second hose guide toward the brake caliper. Further, the brake hose has a flexural rigidity, lower than the high flexural rigidity, in the region extending from the portion held by the second hose guide toward the master cylinder. Therefore, the wear resistance and fatigue strength of the brake hose positioned closely to the brake caliper are increased.

When the brake hose is axially moved, the portion of the brake hose with the high flexural rigidity is not bent, but the portion of the brake hose that is closer to the master cylinder can be bent. Thus, the brake hose can be moved without undue trouble.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle comprising:
    a master cylinder;
    a brake for a rear wheel of said motorcycle;
    a brake hose having a first end connected to said master cylinder and a second end connected to said brake;
    a frame structure;
    a first portion of said brake hose being fixed to a surface of said frame structure;
    a first curved portion formed in said brake hose between said master cylinder and said first portion; and
    a second curved portion formed in said brake hose between said first portion and said brake, wherein said brake hose has a relatively high flexural rigidity in a region extending from said first portion toward said brake, and has a relatively lower flexural rigidity in a region extending from said first portion toward said master cylinder.

2. The motorcycle according to claim 1, further comprising:
    a first hose guide holding said brake hose near said second curved portion.

3. The motorcycle according to claim 2, wherein said first hose guide limits movement of said brake hose away from said frame structure, but allows movement of said brake hose along said surface of said frame structure.

4. The motorcycle according to claim 2, wherein said frame structure is a rear fork for supporting said rear wheel.

5. The motorcycle according to claim 4, wherein said surface of frame structure is an upper surface of said rear fork.

6. The motorcycle according to claim 4, wherein said first hose guide is mounted on a cross member of said rear fork.

7. The motorcycle according to claim 4, wherein said master cylinder is mounted on said motorcycle in a forward position relative to said rear fork, taken in a normal travel direction of said motorcycle.

8. The motorcycle according to claim 1, wherein said brake is a rear disc brake and includes a brake caliper connected to said second end of said brake hose.

9. The motorcycle according to claim 1, wherein said first curved portion is a first U-shaped portion, and wherein said second curved portion is a second U-shaped portion.

10. The motorcycle according to claim 9, wherein said first U-shaped portion is formed by directing said brake hose forwardly from said master cylinder, taken in a normal travel direction of said motorcycle, and then turning said brake hose rearwardly toward said brake.

11. The motorcycle according to claim 9, wherein said second U-shaped portion is convex toward a center of said motorcycle.

12. The motorcycle according to claim 3, further comprising:
    a second hose guide, wherein a second portion of said brake hose that is closer to said brake than said second curved portion is held by said second hose guide.

13. The motorcycle according to claim 12, wherein said second hose guide limits movement of said brake hose in a direction perpendicular to an axis of extension of said brake hose, but allows said brake hose to move in the axis of extension of said brake hose.

14. A motorcycle comprising:
    a master cylinder;
    a brake caliper for a rear wheel of said motorcycle;
    a brake hose having a first end connected to said master cylinder and a second end connected to said brake caliper;
    a rear fork for rotatably supporting said rear wheel;
    a first portion of said brake hose being fixed to a surface of said rear fork;
    a first curved portion formed in said brake hose between said master cylinder and said first portion;
    a second curved portion formed in said brake hose between said first portion and said brake caliper; and
    a first hose guide attached to said rear fork and holding said brake hose in the vicinity of said second curved portion, said first hose guide allowing said brake hose to move along a surface of said rear fork, but substantially forbidding any movement of said brake hose away from said surface of said rear fork, wherein said brake hose has a relatively high flexural rigidity in a region extending from said first portion toward said brake caliper, and has a relatively lower flexural rigidity in a region extending from said first portion toward said master cylinder.

15. The motorcycle according to claim 14, wherein said second curved portion is a U-shaped portion that is convex toward a center of said motorcycle.

16. The motorcycle according to claim 14, further comprising:
    a second hose guide, wherein a second portion of said brake hose that is closer to said brake caliper than said second curved portion is held by said second hose guide.

17. The motorcycle according to claim 16, wherein said second hose guide limits movement of said brake hose in a direction perpendicular to an axis of extension of said brake hose, but allows said brake hose to move in the axis of extension of said brake hose.

* * * * *